United States Patent
Anafi et al.

(10) Patent No.: US 7,526,681 B2
(45) Date of Patent: Apr. 28, 2009

(54) SOFTWARE TESTING FRAMEWORK

(75) Inventors: Yuval Anafi, Ra'anana (IL); Igor Borodin, Netanya (IL)

(73) Assignee: SAP Portals Israel Ltd., Ra'anana (IL)

( * ) Notice: Subject to any disclaimer, the term of this patent is extended or adjusted under 35 U.S.C. 154(b) by 437 days.

(21) Appl. No.: 11/501,188

(22) Filed: Aug. 7, 2006

(65) Prior Publication Data

US 2008/0127101 A1 May 29, 2008

(51) Int. Cl.
*G06F 11/00* (2006.01)
(52) U.S. Cl. ...................................... 714/38
(58) Field of Classification Search ................... 714/37, 714/38, 46, 57; 717/121–126
See application file for complete search history.

(56) References Cited

U.S. PATENT DOCUMENTS

| | | | | |
|---|---|---|---|---|
| 5,414,836 | A * | 5/1995 | Baer et al. | 714/38 |
| 7,337,431 | B1 * | 2/2008 | Barnes et al. | 717/124 |
| 2003/0058836 | A1 * | 3/2003 | Dubovsky | 707/102 |
| 2003/0212938 | A1 * | 11/2003 | Sutton | 714/724 |
| 2004/0015975 | A1 * | 1/2004 | Nandigama et al. | 718/104 |
| 2004/0153830 | A1 * | 8/2004 | Cebula et al. | 714/38 |
| 2005/0172270 | A1 * | 8/2005 | Dathathraya et al. | 717/124 |
| 2006/0123389 | A1 * | 6/2006 | Kolawa et al. | 717/101 |

OTHER PUBLICATIONS

JUnit FAQ, Last Modified on Feb. 20. 2006, printed on May 14, 2007, from http://junit.sourceforge.net/doc/faq/faq.htm (26 pages).
Web pages from http://www.junit.org/index.htm, printed on May 14, 2007 (4 pages).

* cited by examiner

*Primary Examiner*—Nadeem Iqbal
(74) *Attorney, Agent, or Firm*—Buckley, Maschoff & Talwalkar LLC

(57) ABSTRACT

A software testing framework is described. In one embodiment, the software testing framework is run on a client-side computer system and provides the user an integrated graphical software development and testing environment for use with software programs written in a graphical environment. The software testing framework enables a user to graphically compose software, and configure a number of tests, or test suits, required to validate the operation of software without the need for user supplied custom testing software or program coding.

19 Claims, 14 Drawing Sheets

VCUnit Architecture

4.4) Script "Assert"

Functions for asserting conditions.

I. Assert Functions

| Name | Description |
| --- | --- |
| *fx* ASSERT_EQUALS | ⊞ Asserts that two objects have equal values (not applicable for arrays!). |
| *fx* ASSERT_EQUALS_MSG | ⊞ Asserts that two objects have equal values (not applicable for arrays!) and prints an additional error message. |
| *fx* ASSERT_FALSE | ⊞ Asserts that a condition is false. |
| *fx* ASSERT_FALSE_MSG | ⊞ Asserts that a condition is false and prints an additional error message. |
| *fx* ASSERT_NOT_EQUALS | ⊞ Asserts that two objects do not have equal values (not applicable for arrays!). |
| *fx* ASSERT_NOT_EQUALS_MSG | ⊞ Asserts that two objects do not have equal values (not applicable for arrays!) and prints an additional error message. |
| *fx* ASSERT_NOT_NULL | ⊞ Asserts that an object is not null. |
| *fx* ASSERT_NOT_NULL_MSG | ⊞ Asserts that an object is not null and prints an additional error message. |
| *fx* ASSERT_NULL | ⊞ Asserts that an object is null. |
| *fx* ASSERT_NULL_MSG | ⊞ Asserts that an object is null and prints an additional error message. |
| *fx* ASSERT_TRUE | ⊞ Asserts that a condition is true. |
| *fx* ASSERT_TRUE_MSG | ⊞ Asserts that a condition is true and prints an additional error message. |

FIG. 4

4.1) Class "TestPanel"

Panel for organizing, displaying and running tests.

Inherits: Object

Methods

| Name | Description |
|---|---|
| addGroup | Adds a new test group to the panel with the given label. |
| addTest | Adds a new test to the panel with the given label. |
| extractTests | Defines new test group on the panel with the *grpLabel* as label, extracts all the methods with "test" prefix in their names from the class *testClass* and adds them to the panel. |

Remarks

An instance of this class ($TEST) is created automatically by the test framework, user should not create instances directly. Code that calls the methods of this class should be contained in .gs file with CONFIGURE TASKPANELS header.

FIG. 5

4.3) Class "TestSuite"

An object that constructs test suite and is able to run it.

Inherits: Object

Methods

| Name | Description |
|---|---|
| addTest | Adds a new test to the suite. |
| clear | Removes all the tests from the suite. |
| countTests | Returns the number of tests in the suite. |
| extractTests | Extracts all the methods with "test" prefix in their names from the class testClass and adds them to the suite. |
| getExecTime | Returns the total execution time of the suite. |
| getFailedTests | Returns all the failed tests executed by last run() call. |
| getNoResultTests | Returns all the tests executed by last run() call and returned no result. |
| getSucceededTests | Returns all the succeeded tests executed by last run() call. |
| getTests | Returns all the test definitions in the suite. |
| print | Writes to the output the definitions of all the tests in the suite. |
| removeTest | Removes the specified test to the suite. |
| run | Runs all the tests in the suite one by one. For each test in the suite, if a test class of a test defines a method named setUp, this method will be called before the test itself. If a test class of a test defines a method named tearDown, this method will be called after the test. |

FIG. 6

SOFTWARE TESTING FRAMEWORK

The present application is related to co-pending patent application Ser. No. 11/454,610, entitled "Programming Language Techniques For Client-Side Development", filed Jun. 16, 2006, patent application Ser. No. 11/182,725 entitled "Declarative Specification Of Model Visualizations", filed Jul. 15, 2005; and patent application Ser. No. 11/324,155, entitled "Executable And Declarative Specification For Graphical User Interfaces", filed Dec. 29, 2005, the entire contents of these applications are herein incorporated by reference for all purposes.

BACKGROUND

The present invention relates to the field of computer software testing, and in particular to methods and apparatus for creating, modifying, and using test programs to test the operation of software programs developed in an application modeling framework.

A wide variety of application modeling frameworks are used to reduce the time and effort spent in developing and testing software applications, especially business applications. On the development side, one such modeling framework is SAP NETWEAVER™ Visual Composer ("Visual Composer") from SAP®, Germany. Visual Composer facilitates model-driven content development that enables applications to be created easily. In one application, Visual Composer provides a powerful framework that facilitates the creation of content, for example for SAP Enterprise Portal, using modeling capabilities and a visual user interface that enables applications to be created without manually writing code (code-free creation of applications). It provides sophisticated, yet simple-to-use tools for creating portal snippets (e.g., SAP iViews) that process data from back-end systems, including SAP and third-party enterprise systems. Visual Composer reduces the effort to create applications, allows reuse of already existing applications, and reduces costs for maintenance. Visual Composer is a fully Web-based application allowing (virtual) teams to easily build or customize pages and iViews as needed, accessing the software from virtually any machine worldwide.

Application modeling frameworks such as Visual Composer present a programming model to enable developers to access, manipulate, and extend the underlying application model. Further, these tools are typically client-side tools that have to work within a graphical user interface such as a browser program. They also need to support distributed development and evolution of modeling languages across separate teams.

Conventionally, in order to test the operation of code, or a portion of a program, a programmer may write test code or use test code already developed to test the program with respect to a particular software platform. For example, a Java programmer may develop their own testing code in Java, or may use a testing platform such as JUnit, which has been developed to provide a testing platform for Java developers. Other testing platforms such as XMLUnit, HTMLUnit, CUnit, etc., have been developed to assist programmers with testing software developed in extensible markup language (XML), hypertext markup language (HTML), script languages such as Java script, etc.

Generally, software testing, whether developed in a code-based environment or developed in an application modeling framework, is used to expose problems with the software to programmers, so they can debug software programs (code). As software developers usually generate their programs in a particular software language relevant to the platform they are using to generate the software programs, testing platforms have been developed to accommodate the debugging process for particular software platforms. For example, many code-based software developers work on platforms that allow them to debug programs in JAVA, C++, whereas other software programmers work on platforms that allow them to debug programs in scripted languages such as PERL, JAVA SCRIPT, etc. Similarly, using application modeling frameworks such as Visual Composer, software developers may debug programs used to extend a user's application. Regardless of how the programs are debugged, once the programs debugged to the satisfaction of the software developer, the software programs may then be processed (e.g., compiled) for use by clients who run the program on processor platforms suitable for the particular program.

Software testing platforms are often used to emulate the operation of the program in the software environment for its intended use. For example, software companies typically provide a testing platform for the software company's software such that developers and customers may test the software company's software in an operational environment that emulates the customer's business systems. Unfortunately, with regard to client-side application modeling, conventional platforms such as JUnit, require specialized coding customization to add or modify software testing, and/or adapt a particular test report to a user's system requirement. In addition, many of the custom coding process and test reports may require a custom user interface (UI) which adds to the complexity and cost of software development.

Therefore, what is needed is a software development and testing framework that allows a user to create and execute tests developed to test changes to a business enterprise software program, where the tests can be applied in a flexible way that is easily integrated with a user's software testing system and provides a simple to operate user interface.

BRIEF SUMMARY

Embodiments of the present invention include a software testing framework that enables a user to graphically develop software tests and perform software testing for software developed in a graphical software modeling environment. In one embodiment, the software testing framework utilizes a graphical user interface (UI) that provides graphical tools adapted to enable the user to select and customize a particular test interface, develop a suit of software tests, and execute software tests for applications written in a graphical development environment.

In one embodiment, a UI provides a user with an integrated graphical interface to a graphical application development panel and a graphical test panel which allow a user to both develop and test applications using a single integrated interface. The UI also provides the user with the ability to view results of software testing through a test report window, and search for previous testing date using a test report browser.

In one embodiment the present invention provides a method of developing software testing programs for software developed in an application modeling framework. The method includes receiving a first program which includes a first set of software tests and user interface parameters, receiving a second program which includes a test selection tool, a software design tool, and a user interface configuration tool, generating a graphical user interface using the first program and the second program, wherein the graphical user interface provides an integrated software testing environment including a design window, a test window, and a configuration window associated with respective test selection tool, the software design tool, and the user interface configuration tool, and selecting at least one software test from the first set of software tests.

In one embodiment the present invention provides a computer system for testing software developed in an application modeling framework. The computer system includes a processor and a computer readable storage medium coupled to the processor. The computer readable storage medium includes instructions stored therein for directing the processor to test software. The instructions include code for importing at least one class and at least one test configuration from a software kit, and code for a testing framework configured by the software kit.

In one embodiment the present invention provides a method of testing software programs developed in an application modeling framework. The method includes generating a graphical user interface from at least one software test kit and a graphical interface file configured by the at least one software test kit where the graphical user interface includes at least a software design interface, a software testing interface, and a test reporting display, generating a test model by selecting at least one software test from the software test kit adapted to test software code developed in a graphical environment, and executing the software test.

BRIEF DESCRIPTION OF THE DRAWINGS

FIG. 4 is a high-level illustration of functions used in the development of software tests in accordance with embodiments of the invention;

FIG. 5 is a high-level illustration of methods that may be used with generating software tests in accordance with embodiments of the invention;

FIG. 6 is a high-level illustration of methods used in the development of a suit of software tests in accordance with embodiments of the invention;

These and other embodiments of the invention are described in further detail below.

DETAILED DESCRIPTION OF EXEMPLAR EMBODIMENTS

Embodiments of the invention are directed to a software testing framework adapted to enable a user to graphically develop and execute software tests that are designed to analyze and test software generated in an application modeling framework environment. In one embodiment, a software testing program is integrated with an application development framework and application testing framework in order to generate an integrated user interface that is capable of developing an application in a graphical environment and provide a user with tools for developing and executing software tests for programs developed on an application development framework. The user interface also is configured to enable a user to execute software tests automatically, or manually, using a graphical interface. Once the tests are either invoked automatically, or manually, the user interface may be used to display results of the testing to the user.

Figure 1:
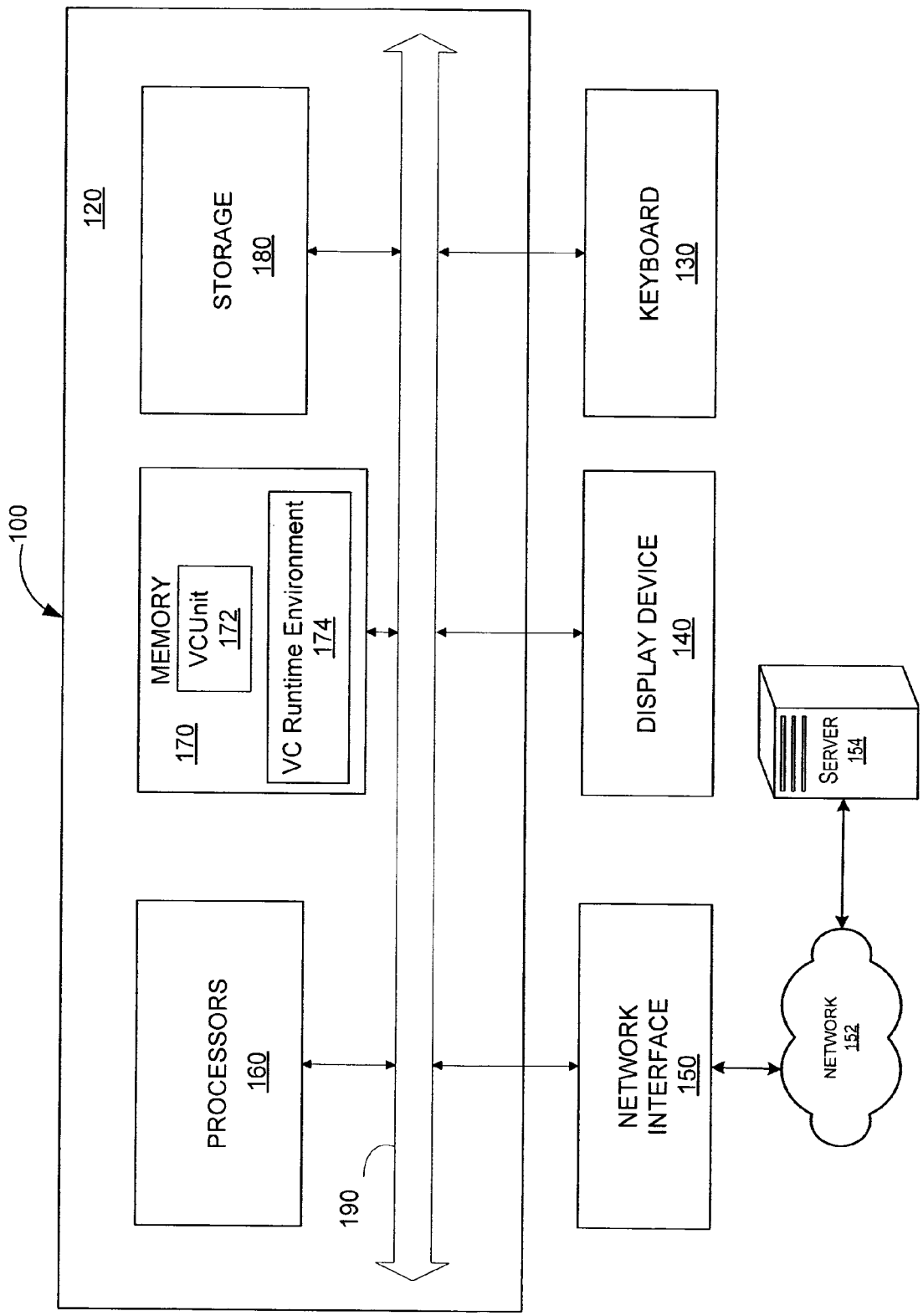
FIG. 1 is a simplified block diagram of one embodiment of an application modeling framework system for software development and testing in accordance with embodiments of the invention.

FIG. 1 is a block diagram of a software testing system 100 for testing software programs developed in an application modeling framework according to an embodiment of the present invention. An application modeling framework is a software program that enables creation of a model. The model created using a modeling framework may be for a system, application, and the like, and is typically (but not necessarily) created using some graphical notation. In one embodiment, a modeling framework may be a design-time framework or set of tools that enables applications to be developed using visual tools without having to perform code-based programming. An example of a modeling tool is SAP NETWEAVER™ Visual Composer ("Visual Composer") from SAP®, Germany. Other examples of a modeling framework include Rational Rose, Borland Together, Microsoft Visio, and others. Software testing system 100 depicted in FIG. 1 is merely illustrative of an embodiment incorporating the present invention and is not intended to limit the scope of the invention as recited in the claims. One of ordinary skill in the art would recognize other variations, modifications, and alternatives.

In one embodiment, software testing system 100 includes a monitor 110, computer 120, a keyboard 130, a user input device 140, a network communication interface 150, and the like. In one embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 is typically coupled to a communication network 152 to one or more servers 154. In other embodiments, network interface 150 may be physically integrated on the motherboard of computer 120, may be a software program, such as soft DSL, or the like.

In one embodiment, source code for an application is deployed and stored on server 154. Server 154 is configured to serve the source code to software testing system 100 over, for example, communication network 152 in response to a request for the application. When a software testing system 100 receives an application, it installs it in memory 170 and executes it. In one embodiment, the client program that executes the application is a modeling framework such as Visual Composer.

In one embodiment, system 100 may also include software that enables communications over communication network 152 such as the HTTP, TCP/IP, RTP/RTSP, protocols, wireless application protocol (WAP), and the like. In alternative embodiments of the present invention, other communications software and transfer protocols may also be used, for example IPX, UDP or the like. In one embodiment, communication network 152 may include a local area network, a wide area network, a wireless network, an Intranet, the Internet, a private network, a public network, a switched network, or any other suitable communication network. Communication network 152 may include many interconnected computer systems and communication links such as hardwire links, optical links, satellite or other wireless communications links, wave propagation links, or any other mechanisms for communication of information.

Computer 120 typically includes familiar computer components such as a processor 160, and memory storage devices, such as a memory 170, e.g., random access memory (RAM), disk drives 180, and system bus 190 interconnecting the above components. In one embodiment, computer 120 is a PC compatible computer having multiple microprocessors. While a computer is shown, it will be readily apparent to one of ordinary skill in the art that many other hardware and software configurations are suitable for use with the present invention.

Memory 170 and disk drive 180 are examples of tangible media for storage of data, audio/video files, computer programs, embodiments of the herein described invention including test panel engine, reporting engine, report display engine, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In one embodiment, as described below, memory 170 includes VCUnit 172 which is a test modeling framework for developing and executing software tests. Memory 170 also includes a VC runtime environment 174 that may be a graphical user interface (UI) program, such as a browser. As described further below, VCUnit 172 is a software engine that facilitates the testing of applications that may be developed by a modeling framework such as Visual Composer, or other category of software developed on a modeling framework. In an embodiment, VCUnit 172 may be a separate application or may be part of a software application used to upgrade or configure an end user's business applications.

Figure 2:
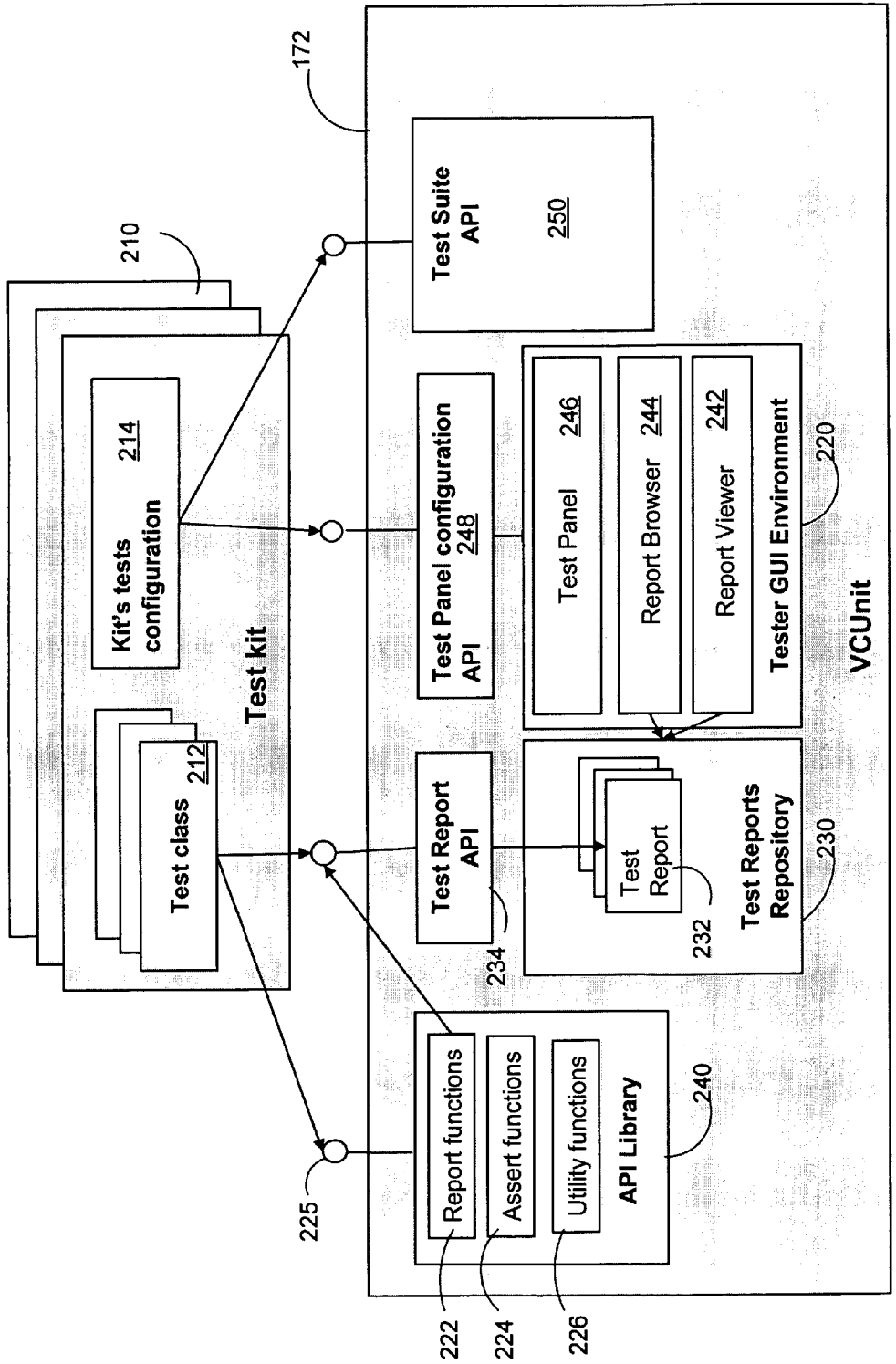
FIG. 2 is a high-level functional block diagram of an application testing framework for developing and executing software test programs in accordance with embodiments of the invention.

FIG. 2 is a high-level functional block diagram of an application testing framework 200 for developing and executing software test programs used to analyze applications developed in a software modeling environment. In one embodiment, application testing framework 200 includes one or more test kits 210 incorporated with VCUnit 172. Application testing framework 200 may be configured using the classes of the test kits 210 integrated with the application program interfaces (API) of VCUnit 172 as described further below.

Test kit 210 may be a self-contained program that contains components such as classes, methods, properties, and the like that are used in conjunction with VCUnit 172 to generate application testing framework 200 with a user interface used by a user to develop and execute software tests for software developed in an application modeling framework environment, such as Visual Composer. In one embodiment, application testing framework 200 may be presented through a graphical user interface such as VC runtime environment 174.

Figure 3:
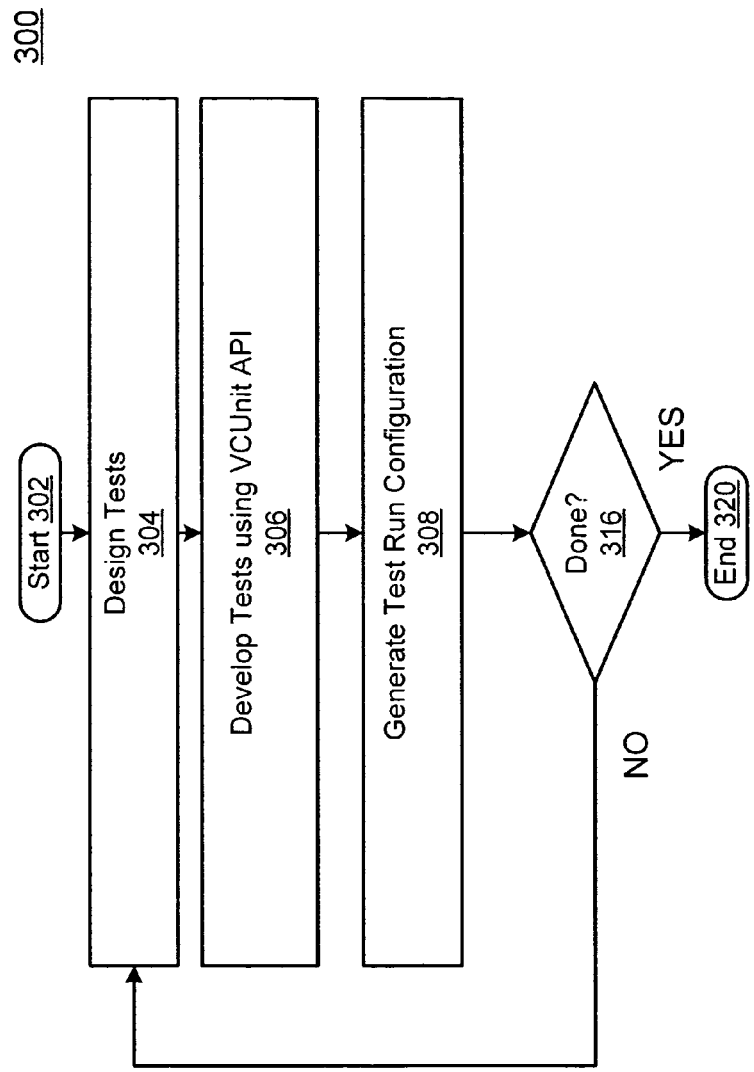
FIG. 3 is a high-level flow diagram illustrating one embodiment of a method of generating software tests in accordance with embodiments of the invention.

In an embodiment, test kit 210 includes test classes 212 and test configurations 214 developed to enable a user to either run a suit of software tests automatically, or provide choices to the user to enable them to develop a custom test or test suit. For example, FIG. 3 illustrates a method 300 of developing a test kit that once integrated with VCUnit 172, can be configured to allow a user of application testing framework system 100 to initiate an automatic software testing process, or manual software testing process, or a combination or the two in the form of a semi-automatic test suit. In one embodiment, at step 302 a test kit developer operates a software development environment such as an integrated development environment (IDE). The IDE may be any suitable software development environment. At step 304, tests are designed to test the functions and operations of software developed in an application modeling framework environment such as Visual Composer.

At step 306, software tests ("tests") are developed using APIs of VCUnit 172. In one embodiment, a programming language (referred to herein as "GmlScript") may be used in developing the applications and tests. GmlScript may be used as a scripting programming language. GmlScript provides various features such as object-oriented programming, client-side scripting, self-contained components, aspect-oriented programming, namespaces and self-contained components (e.g., kits), classes, methods, and properties, prototypes for multiple inheritance, events and listeners for implementing dynamics and constraints, transactions for ensuring model consistency and for undo/redo operations, objects persistency, dynamic loading, introspection, self documentation, preprocessing pragmas, and other features.

GmlScript may be used to write applications and programs that can be executed by a client-side program such as VCUnit 172. The client program that executes a GmlScript application may be hosted by a client-side program such as VC runtime environment 174 or a web browser. A browser is a software application that enables a user to display and interact with text, images, and other information typically located on a server on the World Wide Web or other network. Although browsers are typically used to access the World Wide Web, they can also be used to access information provided by web servers in private networks or content in file systems.

For example, a user may have written the following code "TargetClass" in GmlScript for their business software designed to operate with applications developed with Visual Composer. In this illustration, TargetClass is a part of a "target" test kit 210:

```
Class TargetClass inherit gml:Scenario;
   metadata title = 'TargetClass';
   metadata descr = 'my target class';
   metadata icon16 = '#URL[core.gml~skin:symbols.scenario16.gif]';
   metadata icon32 = '#URL[core.gml~skin:symbols.scenario32.gif]';
   method countElements( )
      var elems = this.getProperty("elements");
      var i = 0;
      for (var el in elems)
```

-continued

```
    i++;
    return i;
end
```

In the above program, TargetClass is a unit and has a method "countElements" that returns a number of elements inside the TargetClass progam.

During test kit development, the test developer may select from predefined tests functions, classes, methods, objects, operations, etc., in order to configure the application testing framework 200. For example, FIG. 4 illustrates assert functions 400 used in the development of software tests such as "ASSERT_EQUALS" which is used to compare whether two objects are equal in value, FIG. 5 illustrates methods 500 used to configure the test panel 246 such as "ADD GROUP" which provides the developer with the tools to add a new test group to the test panel 246, and FIG. 6 illustrates methods 600 used to develop a suit of software tests such as a method "ADD TEST" used to add a test to an existing test suit.

For example, consider the case where a developer developed a class called "TargetClassTester" using the following GmlScript:

Class TargetClassTester inherit gml:Object;

In the above GmlScript, TargetClassTester inherits the properties of a GmlScript element referred to as "object".

A user may create a method (i.e., test) inside the class for later use. For example, the user may create a method within the class named TargetClassTester using the following GmlScript:

```
Class TargetClassTester inherit gml:Object;
method testCountElements
    try{
        TEST_NAMED('countElements test');
        REPORT_MESSAGE('Creating the TargetClass object');
        var trg = $ENV.model.root.createUnit("#NS[TargetClass]");
        REPORT_MESSAGE('Adding 2 inports');
        trg.getTarget( ).createElement("core.gml:Inport", "elements");
        trg.getTarget( ).createElement("core.gml:Inport", "elements");
        var count = trg.getTarget( ).countElements( );
        ASSERT_EQUALS(count,
        SIZE(trg.getTarget( ).getProperty("elements")));
        return TEST_SUCCESS( );
    }catch(e){
        return TEST_FAILURE(e);
    }
end
```

As illustrated in Table 1, in the above example GmlScript a number of asset functions illustrated in FIG. 4 were applied:

TABLE 1

| Title | Type of Function |
|---|---|
| TEST_NAMED | Report Function |
| REPORT_MESSAGE | |
| REPORT_SUCCESS | |
| REPORT_FAILURE | |
| ASSERT_EQUALS | Assert Function |
| SIZE | Utility Function |

At step 308, the test execution configurations are established. For example, for an automatic test suit, the test execution configuration may be "execute test suit when loaded into VCUnit" 172, or it may be "provide a list of test for selection by a user". At step 316, if the test kit developer is finished, then method 300 ends at step 320. Once the kits are developed, they may be used to configure VCUnit 172 as described below.

In order to generate application testing framework 200, VCUnit 172 and one or more test kits 210 may be loaded and executed in VC runtime environment 174. Referring to FIG. 2, in one embodiment, VCUnit 172 includes a graphical user interface (UI) 220, a test report repository 230, an API library 240, and a test suit API repository 250. VCUnit 172 may be configured to import one or more test kits 210 which include test classes 212 and configuration files 214. To meet the end user's custom business software needs, such test kits 210 may be used by an end user (e.g., customer) as part of the process of customizing and configuring a larger software program or a portion of a software program developed, for example, in Visual Composer.

Figure 8:
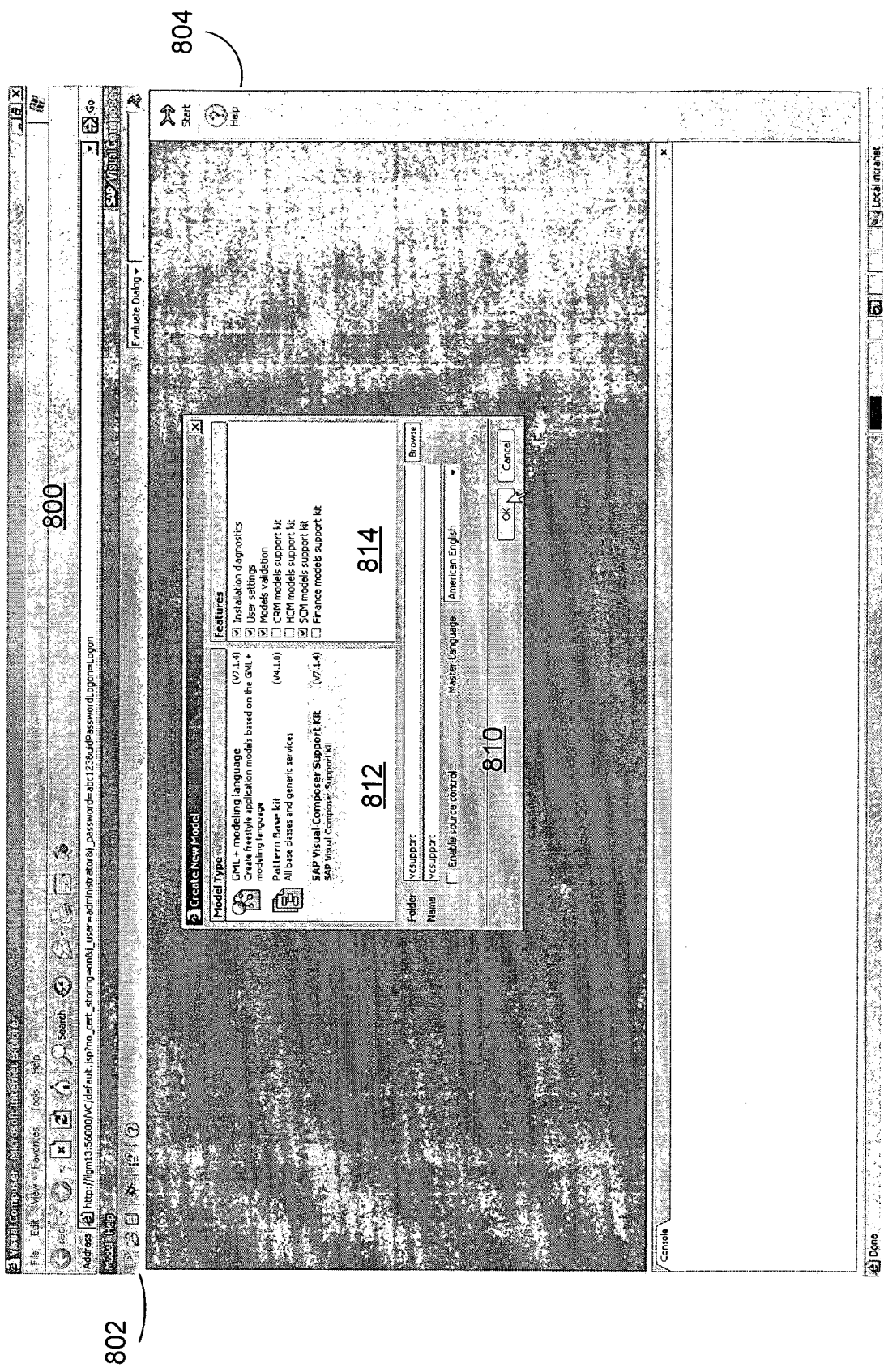
FIG. 8 is a high-level illustration of a graphical user interface adapted to allow a user to graphically generate and execute a test using the application modeling framework system in accordance with embodiments of the invention.

In one embodiment, VCUnit 172 may be accessed though UI 220. UI 220 may utilize a browser program that provides access to VCUnit 172. For example, as illustrated in FIG. 8, VCUnit 172 may be adapted to enable an end user to author and execute software tests using UI 800 described below. UI 220 is displayed via a browser program such as VC runtime environment 174, Mozilla FIREFOX, Microsoft INTERNET EXPLORER, OPERA, Netscape, and Apple SAFARI, and the like. In other embodiments, UI 220 may be a standalone graphical interface program.

UI 220 may provide graphical UI tools configured to enable an end user to author software tests according to embodiments of the present invention. Such UI tools may include a variety of interactive graphical interfaces such as checkboxes, data entry widows, menus, form fields, and the like, configured to provide a functional interface to a user to interact with various functions of VCUnit 172 such as file importing, test selection, searching, and the like. Such UI tools may also be used to select functions such as assert functions, output functions, utility functions, and the like as described below.

In one embodiment, test panel 246 may be configured to provide a user with a visual framework to develop a library of common test functions and generate APIs necessary to organize and run tests. Test panel 246 may provide a user with tools to run a simulated software installation, determine operability, create and/or select user defined tests, etc. For example, test panel 246 may be configured to compose and execute a test suit, display test execution statistics, configure report output options, open and operate other UI tools, etc.

In one embodiment, UI 220 optionally provides the user the ability to view results from executed tests using a report viewer 242. Report Viewer 242 may be configured such that a user may display, print, locally save, email stored reports. A user may search for such stored reports using report browser 244. In one embodiment, report browser 244 displays reports stored on the server sorted by date and time of creation, and allow users to view or delete such reports. UI 220 may be configured to communicate with test kits 210 through test panel configuration API 248 via communication interface 225.

Figure 7:
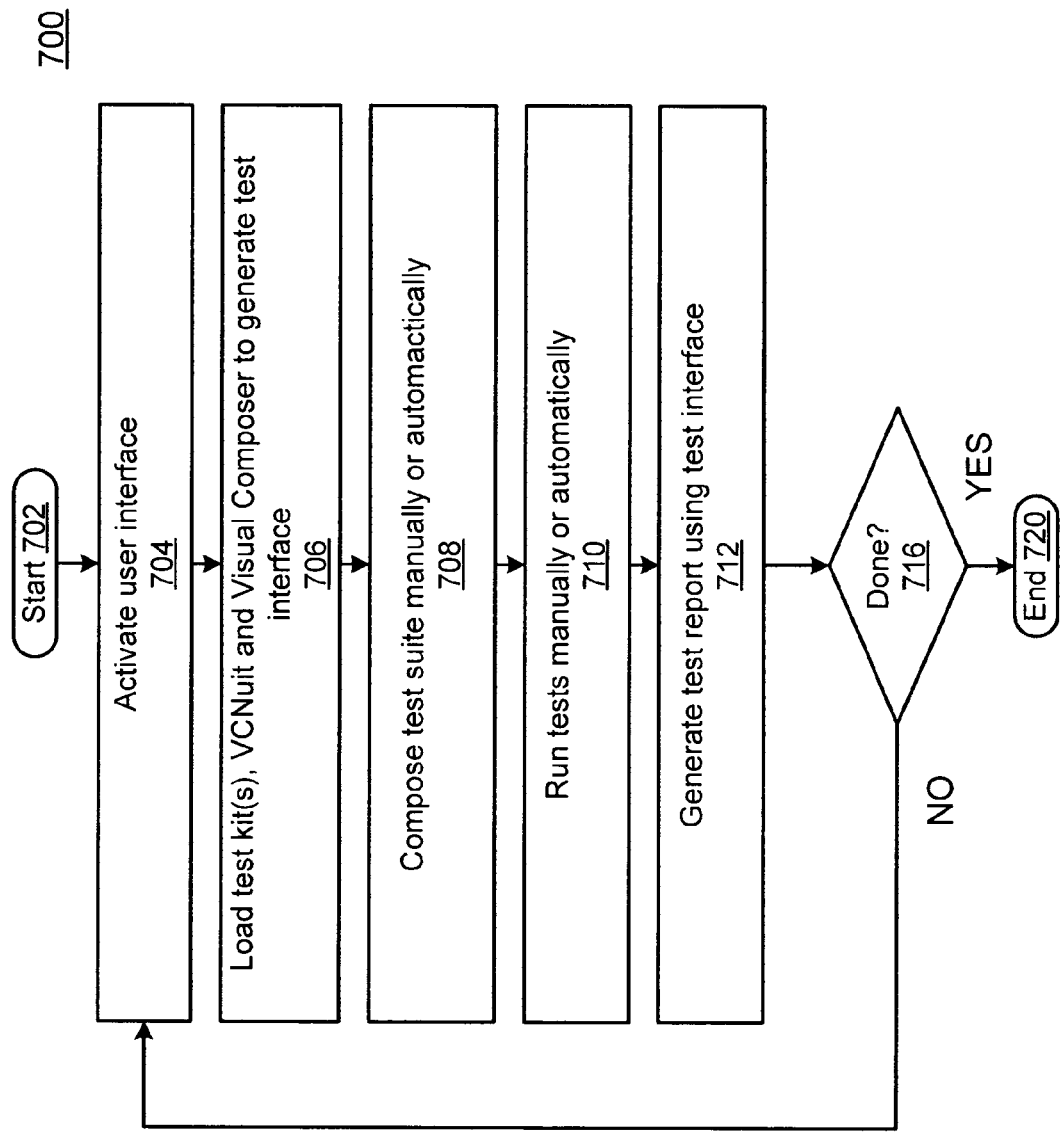
FIG. 7 is a high-level flow diagram illustrating one embodiment of a method of developing and executing software tests in accordance with embodiments of the invention.

FIG. 7 is a high-level flow diagram illustrating one embodiment of a method 700 of developing and executing software tests for software developed in an application modeling environment. Method 700 may be entered into at step 702, for example, by a user activating software testing system 100. In one embodiment, at step 704 VC runtime environment 174 is activated for example by a user loading VC runtime environment 174 from memory 170 for processing by processors 160.

FIG. 8 illustrates the graphical user interface UI 800 displayed within a browser program such as VC runtime environment 174. UI 800 may be adapted to allow a user to graphically operate application testing framework 200. In one embodiment, as illustrated, UI 800 enables a user to open a window 810 that allows a user to create or modify an existing test model (e.g., software test file) using features supplied by one or more test kits 210. At step 706, a user window 810 to select and load Visual Composer, test kits 210 and VCUnit 172 into the VC runtime environment 174.

Once one or more test kits 210 and VCUnit 172 are selected and imported at step 706, UI 800 is configured using API's of VCUnit 172 and by inheriting methods and classes associated with one or more selected test kits 210. For example, UI 800 may be configured using APIs associated with UI 220, test suit 250, and by inheriting methods and test configurations from test classes 212 and test configurations 214 from one or more test kits 210.

At step 708, as illustrated, window 810 may provide the user with a test selection window 812 and test features window 814 to enable the user to compose a test for automatic operation, manual operation, or semi-automatic operation. For example, as illustrated in FIG. 8, test selection window 812 includes a "GML+modeling language" selection, a "pattern base" selection, and a "SAP Visual Composer support kit" (i.e., VCUnit 172). In this illustration, the Visual Composer support kit includes a list of user-selectable features in test features window 814 such as "Installation diagnostics", "User settings", "Models validation", and the like.

In one embodiment, UI 800 includes a file navigation bar 802 and a task bar 804 configured according to the UI configuration established by test kits 210 and the APIs. For example, file navigation bar 802 may enable a user to select open test selection window 812, save a test model, and the like. Task bar 804 may be configured to enable a user to browse for test data, configure UI 800, and the like, as described herein.

At step 708, in one embodiment, once the user selects and loads, for example, VCUnit 172 and the one or more test kits 210, application testing framework 200 may be configured to perform an automatic software testing operation. In this automatic software testing operation, the user may not visually notate the test operation, but may be able to access the results of the test via UI 800. In other words, loading selected test kits 210, VCUnit 172 may be configured to perform an automatic testing process without further user intervention. This is advantageous as such an automatic process enables a user to perform routine tests efficiently without intervention.

Figure 9:
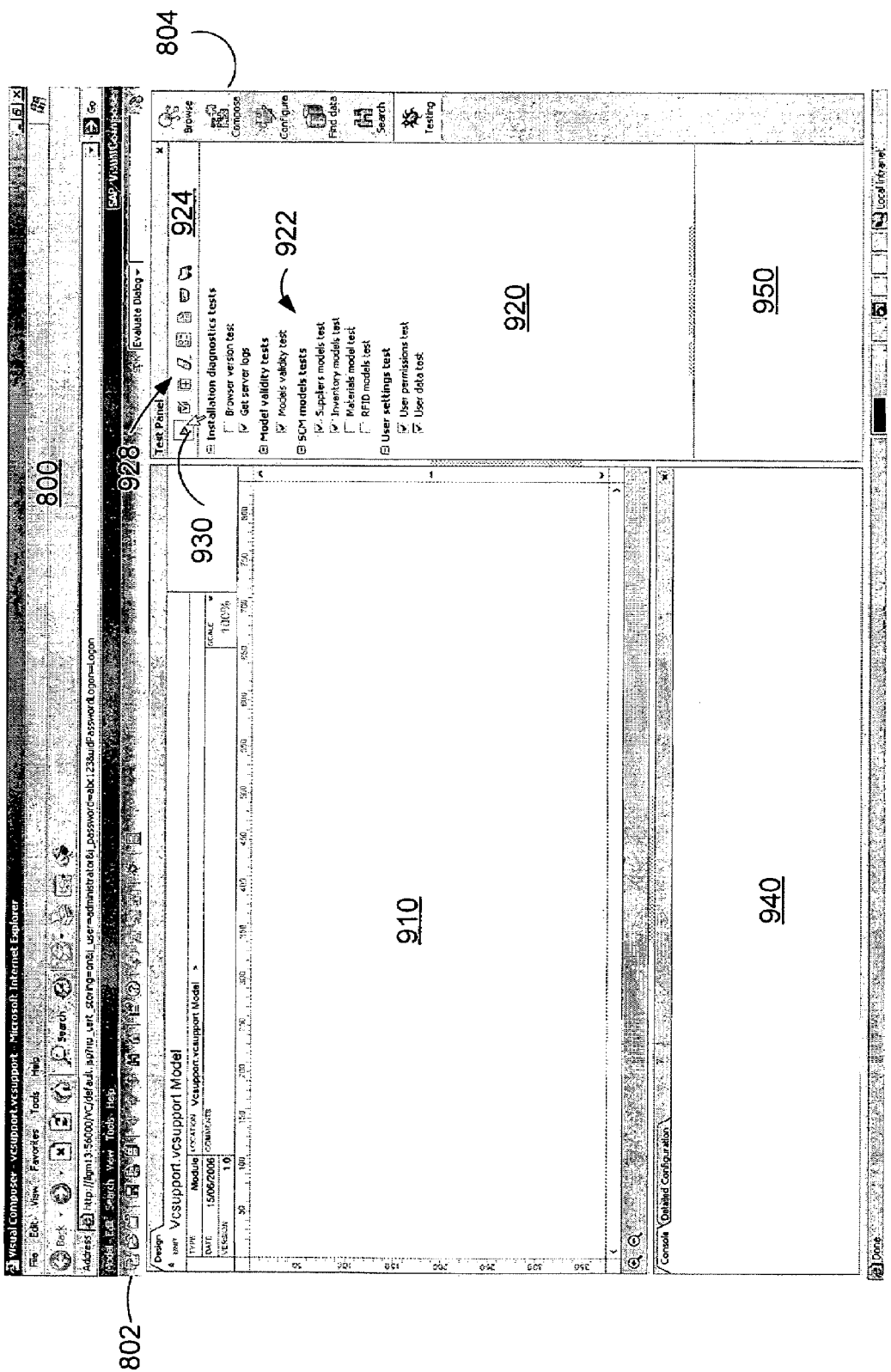
FIG. 9 is a high-level illustration of a graphical user interface used to graphically configure and execute software testing programs in accordance with embodiments of the invention.

Alternatively, at step 708, once the user selects test kits 210 and VCUnit 172, application testing framework 200 may be configured to develop tests based on the configuration of VCUnit 172 after the integration of selected test kits 210. For example, FIG. 9 is a high-level illustration of UI 800 where the VC Unit 172 is configured to enable a user to manually develop one or more tests based on methods and configurations inherited from the one or more installed test kits 210.

As illustrated, UI 800 may be configured by VCUnit 172, Visual Composer, VCUnit 172, and one or more tests kits 210 to generate a Visual Composer design panel 910, test panel UI 920, configuration view panel 940, and test report window 950, described further below. As described above with regard to Visual Composer and application modeling, Visual Composer design panel 910 enables a user to develop software applications in a typically code-free visual environment.

With regard to software testing, test panel UT 920 enables a user to select and run tests for applications developed using Visual Composer, configuration panel 940 enables a user to view and modify test configurations, and test report window 950 provides the user with a display of test results as described below. Advantageously, UI 800 as configured by Visual Composer, VCUnit 172, and one or more tests kits 210 provides the user with an integrated application design and testing environment for developing, testing, and debugging software during design-time in a modeling environment.

In one embodiment, a user may configure a suit of tests by selecting tests and operations from test panel UI 920 configured using test panel configuration API 248 and the loaded test kits 210. As illustrated in FIG. 9, test panel UI 920 may include selection tools 922 such as checkboxes, windows, navigation menus, and the like, adapted to enable a user to select tests, test configurations, and the like. For example, as illustrated, test panel UI 920 includes test such as installation diagnostic tests, model validity tests, SCM models test, user settings tests, and the like.

In one embodiment, at step 710 tests may be run automatically, manually, or semi-automatically. Test panel UI 920 may provide a test execution bar 922. Test execution bar 924 includes tools 928 to enable a user to execute manage a suit of tests. For example, such tools 928 may include a test execution tool 930 configured to execute a suit of tests when selected by a user. Such tools 928 may also include other test manipulation tools designed to enable a user to modify a test suit configuration such as test erase, select all, expand all, view configuration, and the like.

At step 710, tests are executed for example, by a user operating test execution tool 930. Once test execution tool 930 is selected, tests are performed as selected by the user performing the tests. Such tests performed during design time to allow a user to evaluate applications written in a visual software modeling environment such as Visual Composer before the applications are persisted to the user's client-side software. This is advantageous as such testing allows a user to visually debug software changes, upgrades, etc. either developed by the user or supplied by a third party vendor, in an operational environment that simulates the operation and API of their business application prior to applying the software to actual operation.

Figure 10:
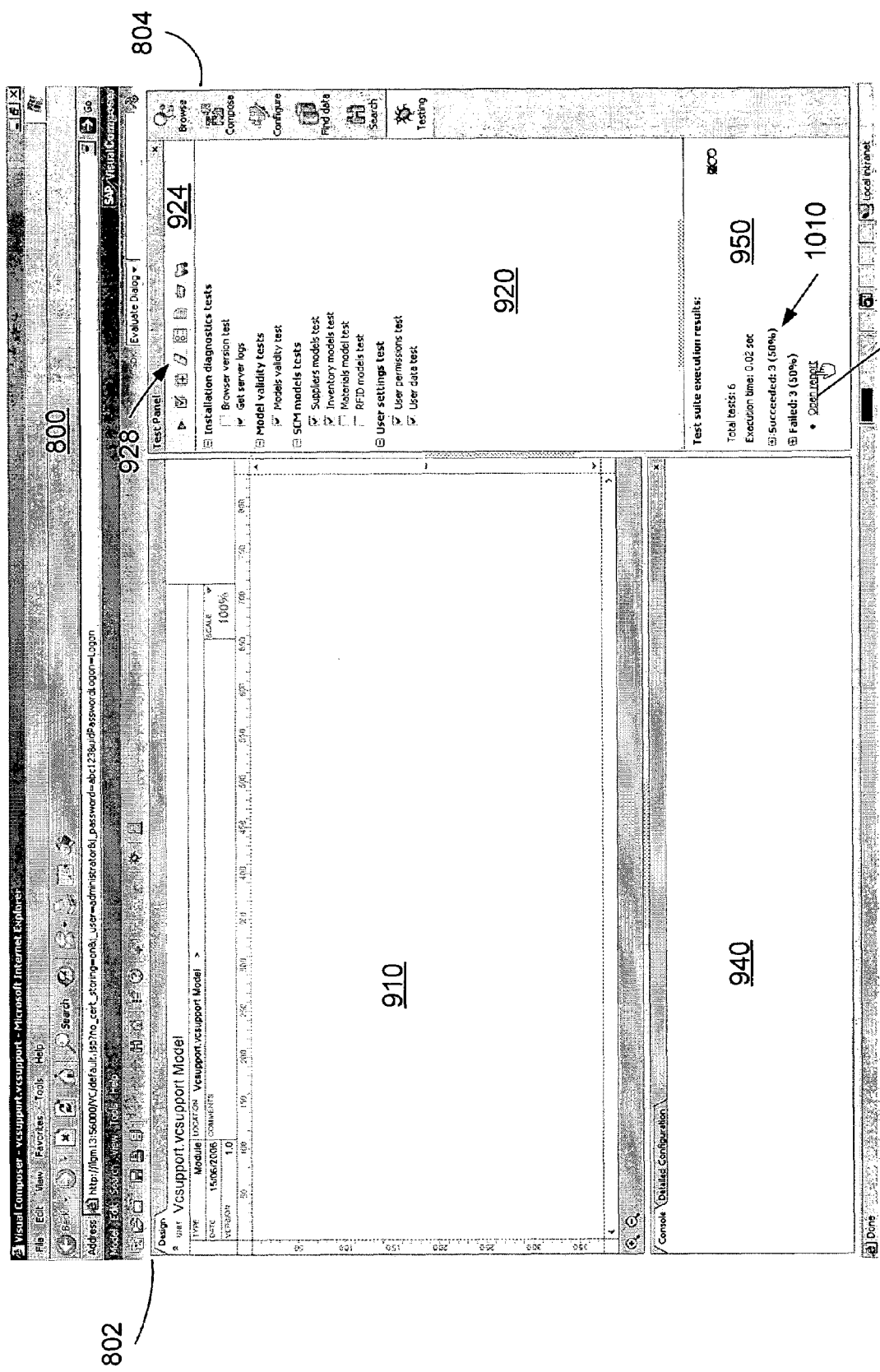
FIG. 10 is a high-level illustration of a graphical user interface employed to graphically display test results in accordance with embodiments of the invention.

The results of such testing may be viewed using UI 800 at step 712. In one embodiment, reporting window 950 may be used to display the results either after or currently with the running of the tests. As illustrated in FIG. 10, a reporting window 950 is configured to display results of one or more tests along with other user defined information. For example, reporting window 950 may display the number of tests executed, the number of tests that passed, the number of tests that failed, and the like. For example, as illustrated in FIG. 10, reporting window 950 shows the total tests executed, the time for execution, the number of tests that passed, the number of tests that failed.

Figure 11:
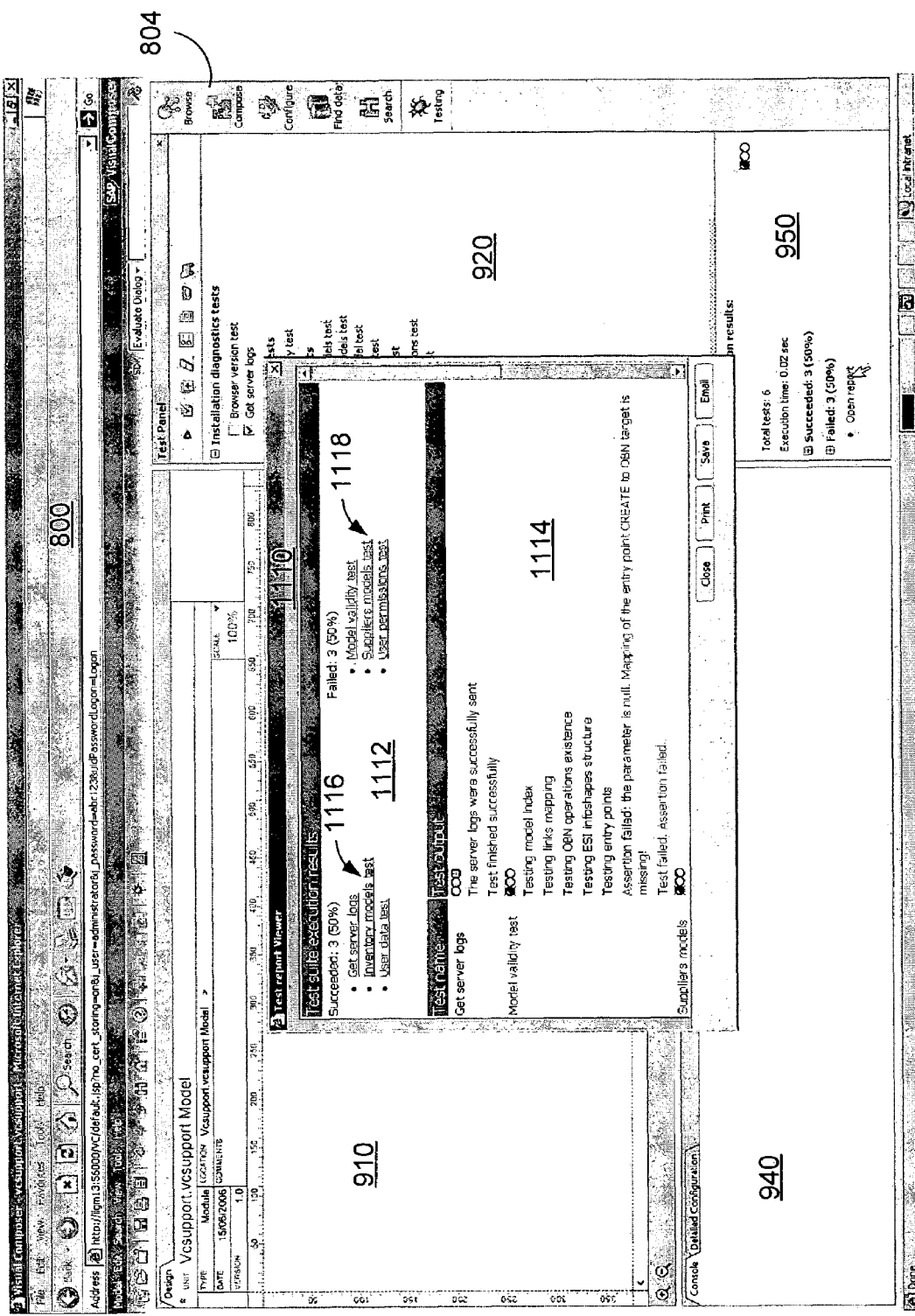
FIG. 11 is a high-level illustration of a graphical user interface employed to graphically retrieve stored test results in accordance with embodiments of the invention.

In one embodiment, reporting window 950 may include a report link 1012 that enables a user to open a separate reporting window. For example as illustrated in FIG. 11, selecting report link 1012 opens test report viewer 1110. In an embodiment, report viewer 1110 is configured according to report viewer 242 and test panel configuration API 228. For example, report viewer 242 may be configured with a test results window 1112 and a test detail window 1114. Test results window 1112 provides the user with various options for reviewing test result data.

Results of the software tests may be divided into "succeeded" and "failed" categories. Such categories allow a user to view data pertinent to test data for either passed of failed tests. For example, as illustrated, test results window 1112 provides the user with data links 1116 for tests that succeeded. Data links 1116 may include links to data such as server log data, an inventory of the tests run, user data testing, and the like. Test results window 1112 may also include data links 1118 for tests that did not pass. For example, data links 1118 may include links to model validity tests, test for supplier's models, user permission tests, and the like. Such test may provide the user with further insight as to why a test failed. For example, the model validity tests may provide the user with data associated with errors associated with the modeled application such as invalid objects, classes, variables, failed assertions, and the like.

Figure 12:
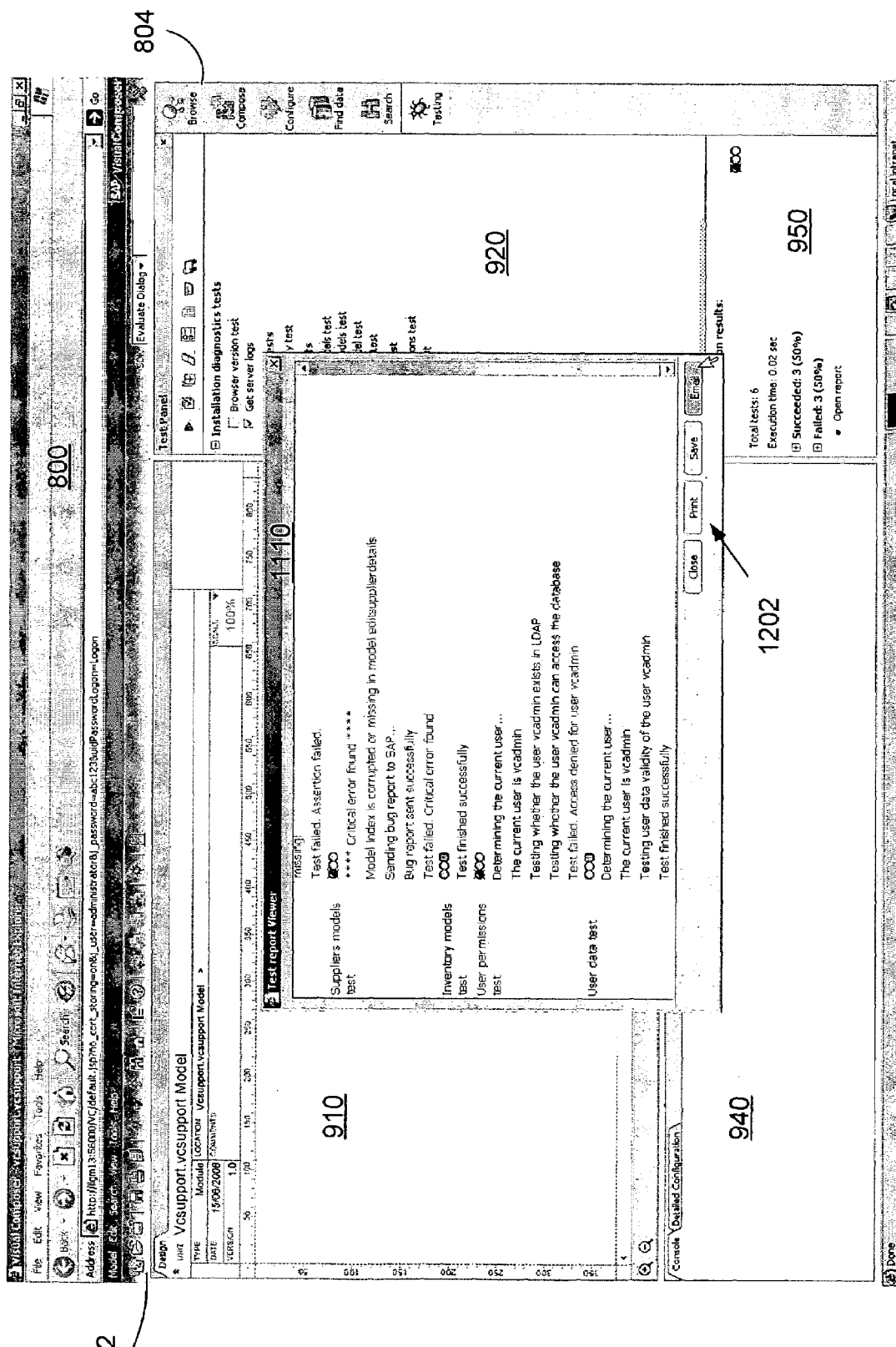
FIG. 12 is a high-level illustration of using a graphical user interface to communicate test results in accordance with embodiments of the invention.

In an embodiment, reporting window 950 may be configured to provide the user with options such as saving a report, printing the report, emailing the report, etc. For example, as illustrated in FIG. 12, test report viewer 1110 may include report output tools 1202 such as close, print, save email, and the like.

Figure 13:
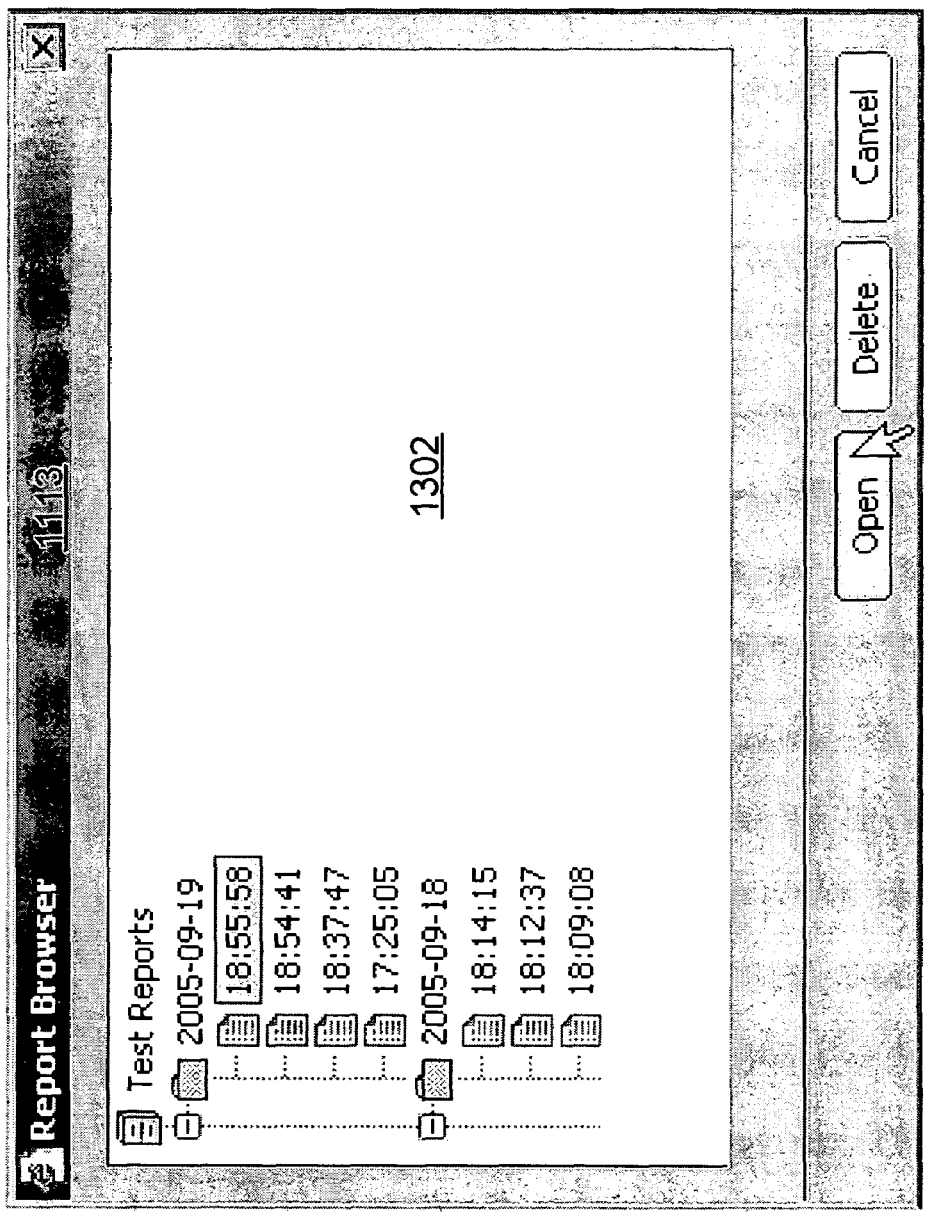
FIG. 13 is a high-level illustration of a graphical user interface for locating and viewing software tests results in accordance with embodiments of the invention.

Reporting window 950 may also include access to a report browser to enable a user to access previous reports. For example, as illustrated in FIG. 13, UI 800 may include a report browser window 1300. Report browser window 1300 may include search window 1310 configured to allow a user to navigate though for example storage 180 to locate and open reports saved from earlier software testing.

At step 716, if the user is finished developing the test, method 700 ends at step 720. If however, the user is not finished, method 700 returns to step 704. For example referring to FIG. 9 a user may create software using Visual Composer panel 910, test such software according to tests selected from test panel 924, and then display results in results panel 950. Advantageously, such design and testing may be done in a interactive sequence where a user may design an application, test the application, use the test results to modify the application, and retest the application with the modification.

Figure 14:
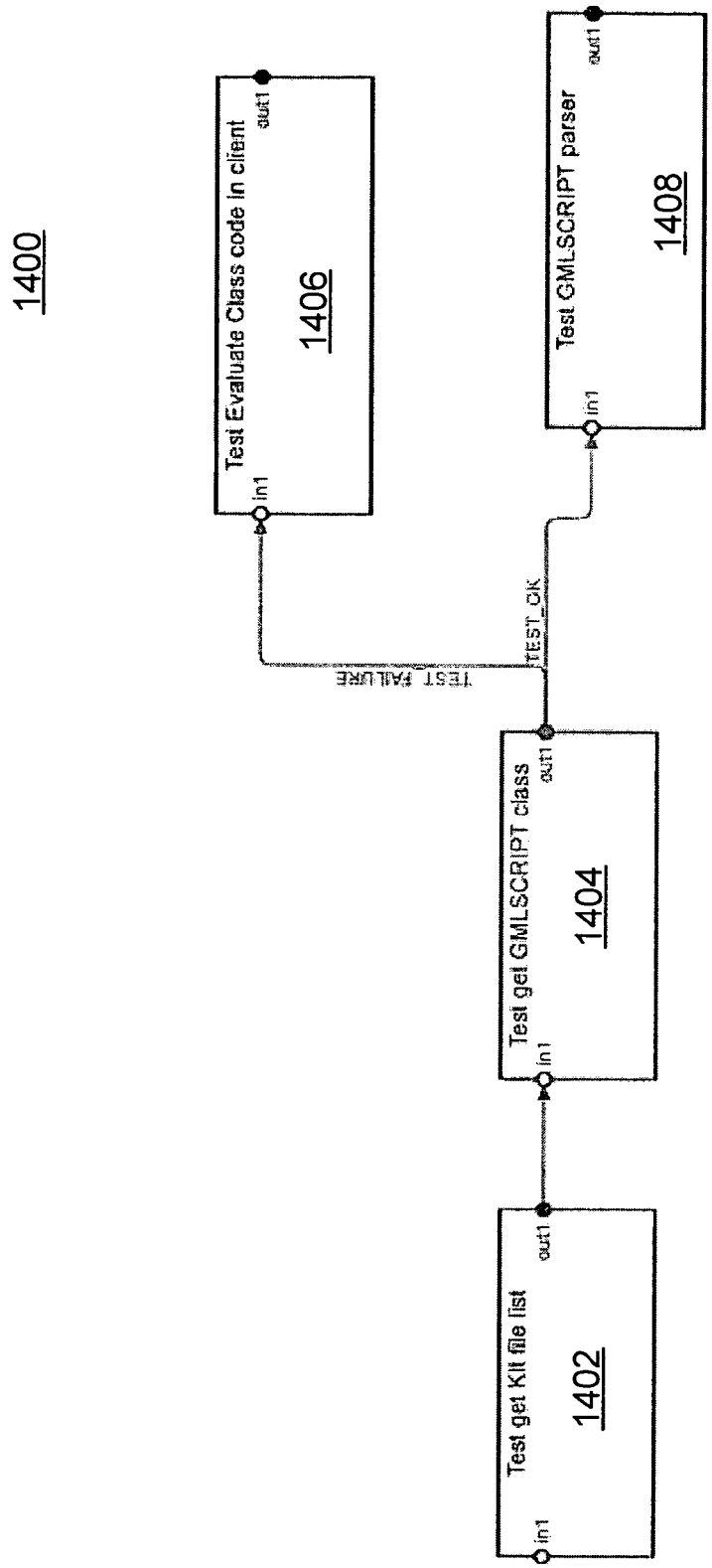
FIG. 14 is a high-level illustration of a graphical model of a test suit in accordance with embodiments of the invention.

FIG. 14 is a high-level illustration of graphically modeling a suit of tests. In one embodiment, application testing framework 200 may be configured to enable a user to model a test suit graphically and establish dependencies and/or conditions between the tests. Application testing framework 200 may also be configured to enable a user to store one or more tests suits for reuse of suit configurations. As illustrated in FIG. 14, application testing framework 200 may enable a user to model a test suit 1400 as interconnected blocks of tests that after each test, the results of the test and test parameters are sent to the next test. For example, block 1402 may represent a VCUnit test which is used to obtain a list of test kits 210 and block 1404 may represent a VCUnit test to obtain the classes associated with the test kits 210 obtained. In one embodiment, as denoted by the connecting line, block 1404 may issue a call to block 1402 to obtain the classes associated with the test kits 210.

In one embodiment, the output of the tests may then be routed to a pass path, or a fail path. For example, block 1406 may be a test call used to evaluate the code to determine the failures, whereas block 1408 may represent a post test process such as parsing the GmlScript. In one embodiment, test framework 200 may include a debugger to display the test code for evaluation and/or repair. For a passed test, the results may be run to a GmlScript parser which may be used to transform the GmlScript into, for example, JavaScript.

In another embodiment, application testing framework 200 may be configured to enable a user to search and/or browse for deployed tests and execute them, and store tests suits for reuse of suite configuration using UI 800. For example, once a user has developed a test suit via test panel 920, the user may save the test suite. In other embodiments, the saved test suit may be configured to automatically execute once selected by a user. In cases where the stored model test kits should be changed to accommodate a new test, such changes may be automatically handled by application testing framework 200. If however, the stored test kits are not changeable (e.g., the stored test kits are protected), application testing framework 200 may alert the user of the issue through UI 800, for example.

In another embodiment, application testing framework 200 may be configured to automatically create data-driven tests for infoactors in an application model. Infoactors are graphical elements of application model which represent back-end logic such as Web Service calls, stored procedures calls, RFCs etc., that will be used in the modeled application during runtime. In one embodiment, application testing framework 200 may provide a user with the ability to select during design-time an infoactor in the user's model to specify the input parameters and expected results, for example, by providing data files. At runtime such a data-driven test will be produced automatically.

In one embodiment, application testing framework 200 may be configured to create test code by recording the actions of a user, such as a software developer, who is developing an application. For example, during recording, the actions of the software developer using, for example, application development panel 910, may be recorded and processed by application testing framework 200 to develop a test, or suit of tests, for the software being modeled. This is advantageous, as such a recording process allows a user to simultaneously develop applications and tests for the application.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

The term "JavaScript" is used to refer to different versions of the ECMAScript Language. The ECMAScript Language is specified in the official ECMA-262 standard.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of developing software testing programs for software developed in an application modeling framework, the method comprising:

receiving a first program which includes a first set of software tests and user interface parameters;

receiving a second program which includes a test selection tool, a software design tool, and a user interface configuration tool;

generating a graphical user interface using the first program and the second program, wherein the graphical user interface provides an integrated software testing environment including a design window, a test window, and a configuration window associated with respective test selection tool, the software design tool, and the user interface configuration tool; and selecting at least one software test from the first set of software tests.

2. The method of claim 1, wherein the first program is developed using GmlScript.

3. The method of claim 1, wherein the first set of software tests are configured to run automatically upon loading into a run-time environment.

4. The method of claim 1, wherein generating comprises forming the integrated software development according to an application program interface.

5. The method of claim 1, wherein selecting at least one software test is user defined.

6. The method of claim 1, wherein selecting at least one software test is preset by the first program.

7. A computer system for testing software developed in an application modeling framework, the computer system comprising:

a processor; and a computer readable storage medium coupled to the processor, wherein the computer readable storage medium includes instructions stored therein for directing the processor to test software developed in the application modeling framework, the instructions comprising:

code for importing at least one class and at least one test configuration from a software kit;

code for a testing framework configured by the software kit;

code for displaying a test panel on a display configured from the combination of the testing framework and the software kit, wherein the test panel comprises at least one graphical user interface tool configured to graphically enable at least one test method of the at least one class selected;

code for directing the processor to enable the at least one test method in response to a user's graphical selection; and code for displaying results of the at least one software test.

8. The computer system of claim 7, wherein the at least one class comprises a test panel class.

9. The computer system of claim 8, wherein the test panel class comprises at least one method for configuring the test panel.

10. The computer system of claim 7, wherein the testing framework comprises code for a test panel application program interface.

11. The computer system of claim 7, wherein the testing framework comprises one or more of test report functions, assert functions, and utility functions.

12. A method of testing software programs developed in an application modeling framework, the method comprising:

generating a graphical user interface from at least one software test kit and a graphical interface file configured by the at least one software test kit, wherein the graphical user interface includes at least a software design interface, a software testing interface, and a test reporting display;

generating a test model by selecting at least one software test from the software test kit adapted to test software code developed in a graphical environment; and executing the software test.

13. The method of claim 12, wherein generating the graphical user interface comprises importing classes from the at least one software test kit.

14. The method of claim 12, wherein generating the graphical user interface comprises configuring the graphical user interface using a testing framework application program interface.

15. The method of claim 12, wherein the software design interface comprises tools configured to enable a user to develop an application in a graphical environment.

16. The method of claim 12, wherein the software testing interface comprises tools configured to enable a user to develop software tests in a graphical environment.

17. The method of claim 12, wherein the test reporting display comprises tools configured to enable a user to search for additional information pertaining to the executed software tests.

18. The method of claim 12, further comprising storing the test model in a database.

19. The method of claim 12, further comprising configuring the test model for automatic execution.

* * * * *